Aug. 11, 1970  T. B. SHEAD  3,523,310
FOOT SUPPORT FOR USE BY THE OCCUPANT OF A BED
Filed Jan. 30, 1968  2 Sheets-Sheet 1
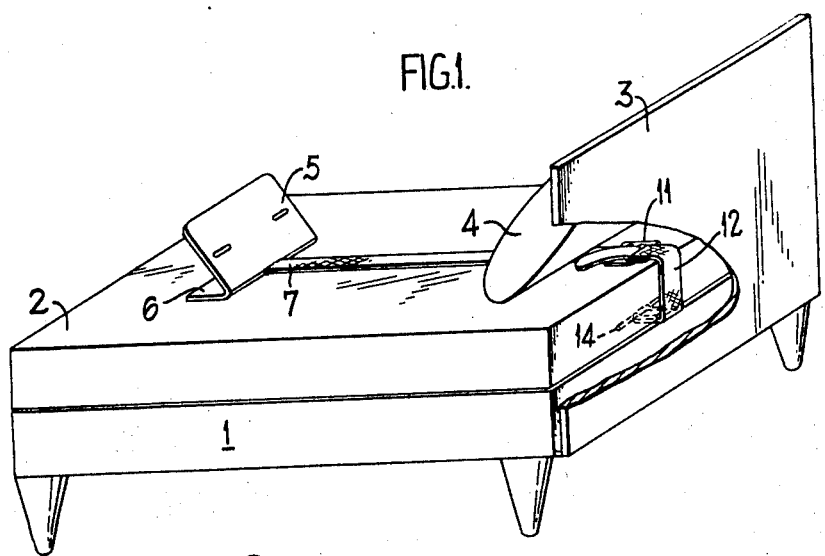
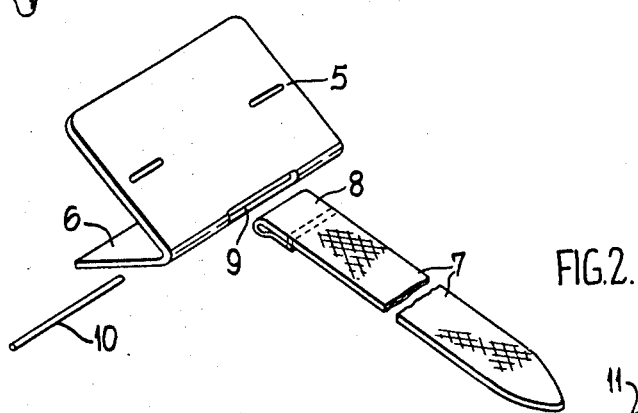
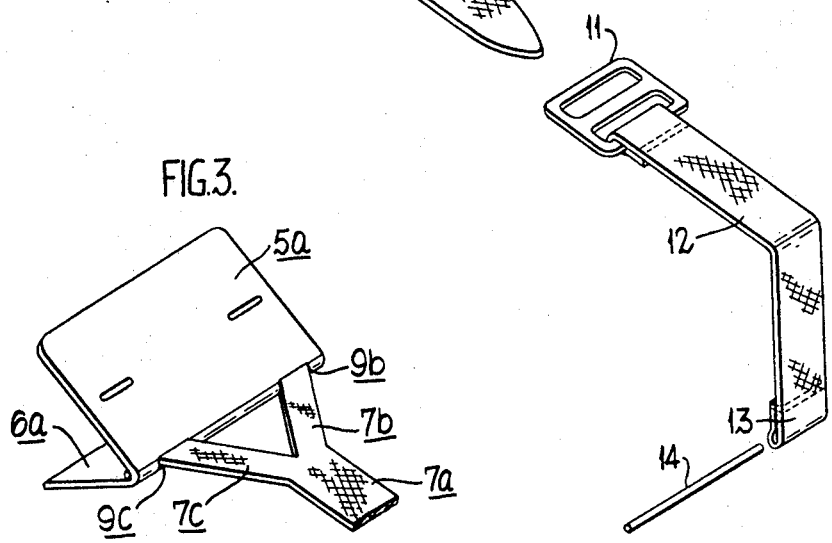
INVENTOR
TERENCE BRIAN SHEAD
BY
Woodhams, Blanchard & Flynn
ATTORNEYS Aug. 11, 1970   T. B. SHEAD   3,523,310
FOOT SUPPORT FOR USE BY THE OCCUPANT OF A BED
Filed Jan. 30, 1968   2 Sheets-Sheet 2
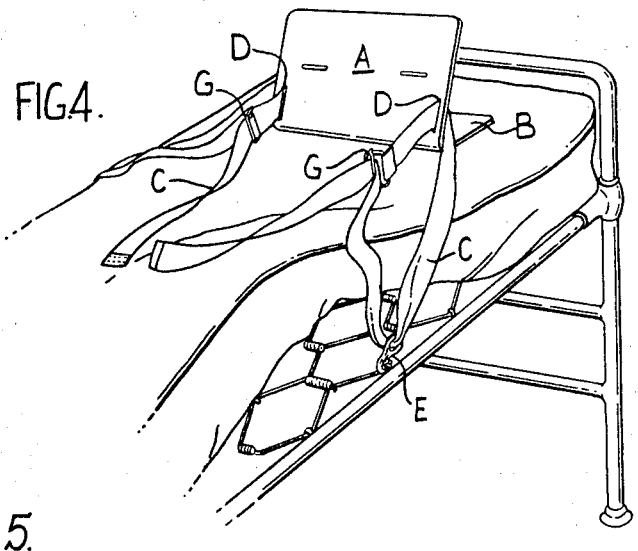
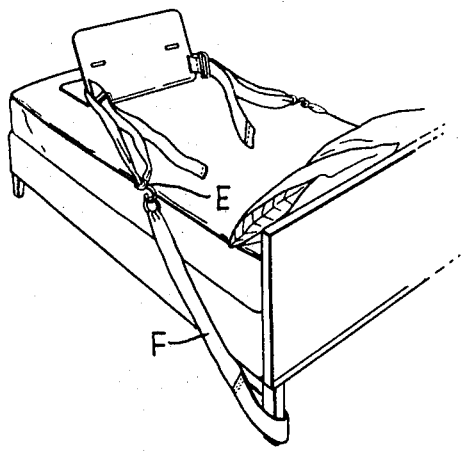
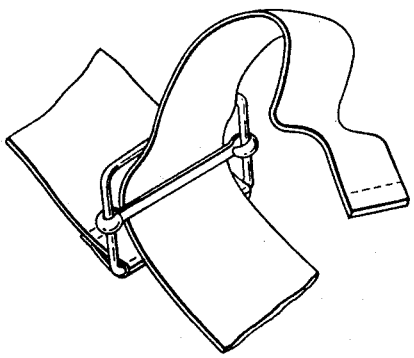
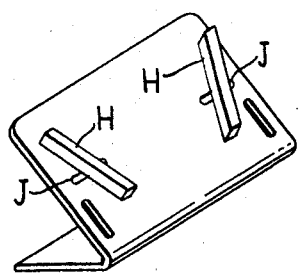
INVENTOR
TERENCE BRIAN SHEAD
BY
Woodhams, Blanchard & Flynn
ATTORNEYS

United States Patent Office 3,523,310
Patented Aug. 11, 1970

3,523,310
FOOT SUPPORT FOR USE BY THE OCCUPANT OF A BED
Terence Brian Shead, Mitcham, England, assignor to Terence Brian Shead and Anthony Francis Shead, Mitcham, England, trading as Shead Brothers
Filed Jan. 30, 1968, Ser. No. 701,671
Claims priority, application Great Britain, Jan. 30, 1967, 4,497/67; Mar. 23, 1967, 13,819/67
Int. Cl. A47c 22/00; A63b 23/04
U.S. Cl. 5—327                                         10 Claims

ABSTRACT OF THE DISCLOSURE

A support for the occupant of a bed, particularly for use in hospitals, for preventing the occupant from gradually slipping or sliding down the bed and comprising a footrest and flexible means secured to the footrest and to the bed which can, if required, be operated by the occupant of the bed, for adjusting and maintaining the position of the footrest in the bed.

---

The invention relates to a support of the kind adapted to be provided in a bed whereby the occupant can, by placing his feet thereon, prevent himself from slipping or gradually sliding down the bed.

It is among the objects of the invention to provide a support of the kind described which does not necessitate the untucking of the bedclothes at the base of the bed to accommodate positioning and fixing means for the support, and in which adjustment of the position of the support in the bed can be easily effected either by the occupant of the bed, or, in the event that the occupant is incapacitated, without the occupant having to be lifted during the adjustment.

It is a further object of the invention to provide a support which also acts as a bed cradle by taking the weight of the bedclothes from the feet and legs of the occupant, and which, in use, does not require a specially constructed bed.

According to the invention a support of the kind referred to comprises a footrest, having a portion inclined to receive the feet of an occupant of a bed, and flexible means engaging the footrest and adapted for connection to the head or side members of the frame of the bed, said flexible means being adapted for effecting adjustment of the position of the footrest in the bed and for maintaining the footrest in a determined position in the bed.

Thus the flexible means may comprise a strap or straps adapted for engagement with the footrest and with the head or side members of the bed, adjustment being effected by means of buckles, or the equivalent, provided intermediate the ends of said flexible means, whereby the length of the flexible means may be adjusted, as required.

The footrest may be formed of a plastics material and bent to present an acute angle formation to provide a base portion, which rests on the bed, and a sloping portion, against which the feet of the occupant are placed, a slot or slots being provided in the footrest to receive the end or ends of the flexible means and to form a readily disconnectible connection between the end or ends of the flexible means and the footrest.

The other end or ends of the flexible means may be secured direct to one or more head or frame members of the bed by hooks or the like. Alternatively intermediate members may be interposed between the flexible means and the frame of the bed.

Advantageously the footrest is so dimensioned that it also acts as a bed cradle to relieve, or remove, the weight of the bedclothes from the feet and legs of the occupant of the bed; it is also preferably not more than 18″ in width, measured horizontally, so that in a normal bed it can be moved to one side of the bed when not required leaving the occupant ample room to lie down with legs outstretched.

Additionally the footrest is advantageously formed of a plastics material as, for example, the material known as Darvic (registered trademark), so as to be sufficiently resilient about the line of division between the base portion and the sloping portion to permit the support, when used, for example, in hospital, to assist in physiotherapy exercises in which the occupant of the bed can push with his feet against the sloping portion and move it relatively to the base portion.

Guide members, for preventing the feet of the occupant from sliding off the edges of the footrest, and/or for keeping the feet in a determined position on the footrest may be provided on the upwardly sloping portion of the footrest; slots may be provided in the footrest to receive projections located on the guide members to allow for lateral and angular adjustment of the guide members. Holding means, as, for example, butterfly nuts, may be provided for engagement with the projections on the reverse side of the sloping portion of the footrest.

The invention is diagrammatically illustrated by way of example in the accompanying drawings in which:

FIG. 1 is a perspective view of a bed, with the headboard cut away and covers removed, and a support according to the invention, in the position of use and provided with a single flexible means;

FIG. 2 is an exploded detailed view showing the flexible means, footrest, and the method of engaging the flexible means with the footrest and the bed;

FIG. 3 shows a modified construction of the engagement of the flexible means with the footrest;

FIG. 4 shows an alternative construction of a support according to the invention as used on a hospital bed;

FIG. 5 shows the support construction of FIG. 4 adapted for use on a divan or home bed;

FIG. 6 shows a buckle or like member for effecting adjustment of the position of the footrest; and FIG. 7 shows a footrest with adjustable guide members.

In the construction illustrated in FIGS. 1 and 2, a bed having a base 1, mattress 2, and headboard 3 is provided with a support according to the invention including a footrest comprising an upwardly sloping portion 5 formed integral with, and inclined to, a base portion 6.

A strap 7 is secured at one end to the footrest by means of a loop 8 in the strap passing through an aperture 9 in the footrest and secured by a pin 10 passing through the loop 8.

The other end of the strap 7 engages in a buckle 11 secured to a strap 12 which, at its other end, has a loop 13 adapted to engage a frame member of the bed and to be held in engagement by a pin 14.

In the modified construction shown in FIG. 3 a strap 7a is divided into two portions 7b and 7c which are secured by passing through apertures 9b, 9c in the footrest 5a, 6a to be held by a pin, not shown in the drawings.

In use, as shown in FIG. 1, the footrest 5 is placed on top of the lower sheet of the bed, the strap 7 passes below the pillow 4, the buckle 11 being secured in position after adjustment and engagement of the strap 12 with the head or a frame member of the bed.

The footrest can subsequently be moved towards the head of the bed or towards the foot of the bed by adjustment of the strap 7 in the buckle 11.

In a modification, not shown in the drawings, of the construction illustrated in FIGS. 1, 2 and 3, the relative positioning of straps 7 and 12 is effected by providing for the engaging surfaces of the straps to be adhesive one to the other when required but adapted to be released without destroying the adhesive properties of the engaging surfaces. A suitable material having such properties is Velcro (registered trademark). In using the modified construction the two straps are placed so as to overlap one another to the required extent and the two surfaces pressed into engagement. The surfaces may be released by stripping one from the other without destroying the adhesive properties of the surfaces.

In the construction illustrated in FIGS. 4 and 5 the support includes a footrest comprising an upwardly sloping portion A formed integral with and inclined to a base portion B.

Straps C engage the footrest through slots D formed in the upwardly sloping portion A and are secured to the bedframe by hooks E either directly as in FIG. 4 or indirectly, by means of intermediate members F, as in FIG. 5.

The straps C pass through buckles G and the free ends are used either by the occupant or by a nurse or assistant to adjust the position of the footrest on the bed.

In operation the footrest A–B is placed on the bed at the approximate position where the feet of the occupant are to rest and the straps C tensioned by pulling on the free ends so that an even pressure is obtained against the feet of the occupant.

Should the occupant wish to have the footrest moved up the bed this can be done, without the necessity of moving the occupant, by pulling on the free ends of the straps.

Should the occupant wish the footrest to be moved down the bed then the buckles, shown in detail in FIG. 6, are reversed and the straps allowed to run through the buckles to the required extent, the straps being then tensioned to provide an even pressure.

The guide members H on the sloping portion of a footrest, and shown in FIG. 7, have been omitted for sake of clarity in the other figures of the drawings.

The guide members H are formed as padded blocks of light-weight material and having on the faces adjacent the sloping portion A projecting members which engage in slots J provided in the sloping portion of the footrest to permit lateral and angular adjustment of the guide members in relation to the footrest so that the feet of the occupant can be prevented from sliding off the edges of the footrest or set at a particular position on the footrest.

After the guide members H have been moved to the required position they are locked in position by means of butterfly-screws, or the like, screwed onto the parts of the projections on the underside of the sloping portion A.

I claim:

1. A support for use by the occupant of a bed, comprising a footrest formed as an acute angle to provide a base portion which rests on the bed and a sloping portion against which the feet of the occupant are placed, the footrest being formed of a plastics material which is sufficiently resilient about the line of division between the base portion and the sloping portion to permit the sloping portion to be moved relative to the base portion by pressure of the feet of the occupant thereon, and flexible means comprising at least one strap adapted for engagement with the footrest by means of at least one slot provided in the footrest, the flexible means being also adapted to be secured to the frame of the bed.

2. A support for use by the occupant of a bed, comprising a footrest formed of a plastics material and bent to present an acute angle formation to provide a base portion, which rests on the bed, and a sloping portion, against which the feet of the occupant are placed, flexible means comprising at least one strap adapted for engagement with the footrest by means of at least one slot provided in the footrest, the flexible means being also secured to the frame of the bed and including foot guide members provided on the sloping portion of the footrest and means mounting the guide members on the sloping portion for permitting lateral and angular adjustment thereof.

3. A foot supporting structure for use by an occupant of a bed, comprising a footrest having a base portion adapted to be positioned on the bed and a foot-engaging portion which is fixedly connected to the base portion and extends at an angle relative thereto, flexible means connected to the footrest for maintaining the footrest in a predetermined position relative to the bed and for permitting the position of the footrest to be selectively varied, said flexible means including at least one strap interconnected to the footrest and positioned so as to be grasped by the occupant of the bed when in a lying position for permitting the position of the footrest to be adjusted.

4. A structure according to claim 3, wherein said strap extends through a slot formed in the footrest and is provided with a buckle on one end thereof, an intermediate portion of said strap being positioned within said buckle so as to form a looped strap portion and a free end strap portion, the free end strap portion being adapted to be grasped by an occupant positioned within the bed for permitting adjustment in the position of the footrest, the looped strap portion passing through the slot in the footrest and having a hook means positioned thereon with said hook means being adapted to be engaged with the frame of the bed.

5. A structure according to claim 3, wherein the flexible means includes a pair of straps each connected to the footrest and each having hook means thereon with the hook means being adapted to be connected to the opposite sides of the frame of the bed whereby the occupant can get into and out of the bed without disconnecting the straps.

6. A structure according to claim 5, wherein each of the straps have a free end portion which can be manually grasped by the occupant of the bed when the occupant is in a lying position for permitting adjustment in the position of the footrest.

7. A structure according to claim 6, wherein the foot-engaging portion of the footrest is provided with a slot adjacent the opposite sides thereof, and wherein each of said straps has buckle means on one end thereof with the other end of each strap extending through its respective buckle means so as to form a free end strap portion and a looped strap portion, the looped strap portion of each strap extending through one of the slots formed in the foot-engaging portion of the footrest, and each of the looped strap portions have hook means thereon adapted for engagement with the frame of the bed whereby the occupant of the bed can adjust the position of the footrest by pulling on the free end strap portions.

8. In combination with a bed having a frame and a mattress positioned thereon, a foot supporting structure comprising a footrest having an inclined portion adapted for engaging the feet of the occupant of the bed, flexible means interconnected between the footrest and the frame adjacent the opposite sides thereof for maintaining the footrest in a selected position, said flexible means including means for permitting the position of the footrest to be selectively varied by the occupant of the bed when the occupant is in either a sitting or a lying position on the bed.

9. A structure according to claim 8, wherein said flexible means includes a pair of strap members with each of said strap members being interconnected to the inclined portion of the footrest, each of the strap members further being interconnected to the frame of the bed adjacent a side thereof.

10. A structure according to claim 9, wherein each of said strap members has buckle means adjacent one end thereof with the other end of each strap member extending through its respective buckle means so as to form a strap loop portion and a free end portion, the strap loop portion being connected to the inclined portion of the footrest and also having hook means thereon interconnected to the frame of the bed adjacent one side thereof.

References Cited

UNITED STATES PATENTS

| | | | |
|---|---|---|---|
| 2,340,666 | 2/1944 | Johanson | 5—327 X |
| 3,173,157 | 3/1965 | Maples | 5—327 |
| 3,284,817 | 11/1966 | Landwirth | 5—327 |
| 3,335,434 | 8/1967 | Gamon | 5—327 X |

CASMIR A. NUNBERG, Primary Examiner

U.S. Cl. X.R.

272—58